(12) United States Patent
Urawaki et al.

(10) Patent No.: US 9,483,172 B2
(45) Date of Patent: Nov. 1, 2016

(54) INFORMATION PROCESSING DEVICE, INFORMATION PROCESSING METHOD, AND COMPUTER-READABLE RECORDING MEDIUM WHICH RECORDS PROGRAM

(75) Inventors: Koji Urawaki, Tokyo (JP); Masahiro Yamazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 349 days.

(21) Appl. No.: 14/112,809

(22) PCT Filed: Apr. 20, 2012

(86) PCT No.: PCT/JP2012/060786
§ 371 (c)(1),
(2), (4) Date: Oct. 18, 2013

(87) PCT Pub. No.: WO2012/144632
PCT Pub. Date: Oct. 26, 2012

(65) Prior Publication Data
US 2014/0047379 A1     Feb. 13, 2014

(30) Foreign Application Priority Data
Apr. 20, 2011   (JP) ................. 2011-094263

(51) Int. Cl.
*G06F 3/048* (2013.01)
*G06F 3/0488* (2013.01)
(Continued)

(52) U.S. Cl.
CPC ........... *G06F 3/0488* (2013.01); *G06F 1/1637* (2013.01); *G06F 3/0481* (2013.01);
(Continued)

(58) Field of Classification Search
CPC .............. G06F 3/14; G06F 8/38; G06F 9/44; G06F 1/1637; G06F 1/1647; G06F 3/1423; G06F 3/048; G06F 3/04817; G06F 3/04886; G09G 5/14
See application file for complete search history.

(56) References Cited

U.S. PATENT DOCUMENTS

2002/0025825 A1* 2/2002 Hirayama ................ H04N 7/18
                                                                455/457
2002/0046261 A1* 4/2002 Iwata ................ G06F 17/30017
                                                                709/219
(Continued)

FOREIGN PATENT DOCUMENTS

JP   04-287094        10/1992
JP   04287094 A  *   10/1992  ............... G09G 5/14
(Continued)

OTHER PUBLICATIONS

Haraty, N. et al. AdWiL: Adaptive Windows Layout Manager, 27th Annual Chi Conference Proceedings, p. 4177-4182, Apr. 9, 2009.*
(Continued)

*Primary Examiner* — Michael J Eurice
(74) *Attorney, Agent, or Firm* — Wilmer Cutler Pickering Hale and Dorr LLP

(57) ABSTRACT

An information processing device (100) is configured by: a controller (205); a first touch panel (103); a second touch panel (104); and a storage (213). The controller (205) includes a window controller (212) for controlling display of a plurality of windows, and stores a history of the use of the plurality of windows in a window history storage (214). When a new application is started up, a new window display layout candidate is generated and displayed according to the history. When the displayed window display layout candidate is selected, windows are displayed with the selected display layout.

7 Claims, 15 Drawing Sheets

(51) Int. Cl.
*G06F 1/16* (2006.01)
*G06F 3/0481* (2013.01)
*G09G 5/14* (2006.01)
*G06F 3/14* (2006.01)
*G06F 9/44* (2006.01)

(52) U.S. Cl.
CPC ....... *G06F3/04817* (2013.01); *G06F 3/04886* (2013.01); *G06F 3/1423* (2013.01); *G06F 9/4443* (2013.01); *G09G 5/14* (2013.01); *G06F 1/1647* (2013.01); *G06F 8/38* (2013.01)

(56) References Cited

U.S. PATENT DOCUMENTS

| | | | | |
|---|---|---|---|---|
| 2003/0129574 A1* | 7/2003 | Ferriol | G09B 5/00 | 434/362 |
| 2003/0179405 A1* | 9/2003 | Seto | H04N 1/00132 | 358/1.15 |
| 2004/0109008 A1* | 6/2004 | Sako | G06T 7/0012 | 345/629 |
| 2004/0212602 A1* | 10/2004 | Nako | G06F 1/1616 | 345/173 |
| 2005/0225540 A1* | 10/2005 | Kawakami | G06F 3/04886 | 345/173 |
| 2005/0240484 A1* | 10/2005 | Yan | G06Q 20/045 | 455/411 |
| 2007/0242421 A1* | 10/2007 | Goschin | G06F 1/1616 | 361/679.27 |
| 2008/0040692 A1* | 2/2008 | Sunday | G06F 3/04883 | 715/863 |
| 2008/0062141 A1* | 3/2008 | Chandhri | G06F 3/0482 | 345/173 |
| 2009/0002335 A1* | 1/2009 | Chaudhri | G06F 3/04815 | 345/173 |
| 2009/0077497 A1* | 3/2009 | Cho | G06F 3/04817 | 715/814 |
| 2009/0262091 A1* | 10/2009 | Ikeda | G06F 3/016 | 345/173 |
| 2009/0267909 A1* | 10/2009 | Chen | G06F 3/04883 | 345/173 |
| 2009/0322689 A1* | 12/2009 | Kwong | G06F 3/04883 | 345/173 |
| 2010/0066643 A1* | 3/2010 | King | G06F 1/1616 | 345/1.3 |
| 2010/0088597 A1* | 4/2010 | Shin | G06F 9/44505 | 715/704 |
| 2010/0103132 A1* | 4/2010 | Ikeda | G06F 3/04883 | 345/173 |
| 2010/0146442 A1* | 6/2010 | Nagasaka | G06Q 10/10 | 715/810 |
| 2010/0151881 A1* | 6/2010 | Jang | H04M 1/72552 | 455/456.1 |
| 2010/0175018 A1* | 7/2010 | Petschnigg | G06F 3/0483 | 715/776 |
| 2010/0293502 A1* | 11/2010 | Kang | G06F 1/1626 | 715/803 |
| 2010/0295802 A1* | 11/2010 | Lee | G06F 1/1626 | 345/173 |
| 2011/0004839 A1* | 1/2011 | Cha | G06F 9/4443 | 715/765 |
| 2011/0004843 A1* | 1/2011 | Yamada | G06F 3/0483 | 715/790 |
| 2011/0181520 A1* | 7/2011 | Boda | G06F 1/1645 | 345/173 |
| 2011/0234515 A1* | 9/2011 | Kamijima | G06F 3/0481 | 345/173 |

FOREIGN PATENT DOCUMENTS

| | | |
|---|---|---|
| JP | 2005-012324 | 1/2005 |
| JP | 2009-163458 | 7/2009 |
| JP | 2010-157207 | 7/2010 |
| WO | WO 2009/087890 | 7/2009 |

OTHER PUBLICATIONS

International Search Report of PCT/JP2012/060786 mailed May 29, 2012 (2 pages).
Extended European Search Report issued by the European Patent Office for Application No. 12774005.8 dated Jun. 10, 2015 (8 pages).
Haraty, N. et al., "AdWil: Adaptive Windows Layout Manager," CHI 2009—Digital Life, New World: Conference Proceedings and Extended Abstracts, the 27th Annual Chi Conference on Human Factors in Computing Systems—Spotlight on Works in Progress—Session 2, Boston, MA, 6 pages (Apr. 4-9, 2009).

* cited by examiner

| WINDOW | | | APPLICATION | | | |
|---|---|---|---|---|---|---|
| ID | POSITION | HIERARCHY | ID | NAME | TYPE | ACTIVATION SOURCE APP ID |
| 401 | LEFT | 1 | 5011 | A BROWSER | BROWSER | 5009 |
| 402 | FULL | 2 | 5012 | HOME APP | LAUNCHER | — |
| 403 | FULL | 3 | 5013 | A BROWSER | BROWSER | 5009 |
| 405 | RIGHT | 4 | 5014 | B MAIL | MAILER | 5013 |
| 406 | LEFT | 5 | 5013 | B BROWSER | BROWSER | 5009 |

| LAYOUT ID | SAVED TIME AND DATE | ACTIVATION APP | | PAIR APP | | |
|---|---|---|---|---|---|---|
| | | APP NAME | POSITION | SUBJECT OF LAYOUT DETERMINATION | TYPE/NAME | POSITION |
| 1 | 7/15 16:21 | A BROWSER | LEFT | APP TYPE | MAIL | RIGHT |
| 2 | 7/15 20:56 | A BROWSER | LEFT | APP NAME | A TEXT EDITOR | RIGHT |
| 3 | 7/16 09:21 | B MAIL | RIGHT | APP NAME | B BROWSER | LEFT |
| 4 | 7/16 09:25 | B MAIL | RIGHT | APP NAME | B TEXT EDITOR | LEFT |
| 5 | 7/16 10:05 | A MAIL | RIGHT | APP TYPE | B MAIL | LEFT |
| ⋮ | ⋮ | ⋮ | ⋮ | ⋮ | ⋮ | ⋮ |

| LAYOUT ID | SAVED TIME AND DATE | ACTIVATION APP | | PAIR APP | | |
|---|---|---|---|---|---|---|
| | | APP NAME | POSITION | SUBJECT OF LAYOUT DETERMINATION | TYPE/NAME | POSITION |
| 1 | 7/15 16:21 | A BROWSER | LEFT | APP TYPE | MAIL | RIGHT |

FIG.13A

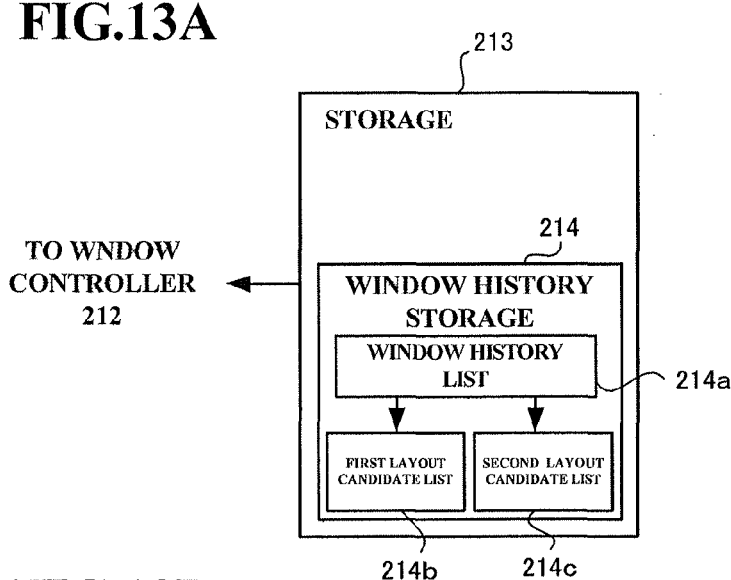

| LAYOUT ID | SAVED TIME AND DATE | ACTIVATION APP | | PAIR APP | | |
|---|---|---|---|---|---|---|
| | | APP NAME | POSITION | SUBJECT OF LAYOUT DETERMINATION | TYPE/NAME | POSITION |
| 1 | 7/15 16:21 | A BROWSER | LEFT | APP TYPE | MAIL | RIGHT |
| 2 | 7/15 20:56 | A BROWSER | LEFT | APP NAME | A TEXT EDITER | RIGHT |
| 3 | 7/16 09:21 | B MAIL | RIGHT | APP NAME | B BROWSER | LEFT |
| 4 | 7/16 09:25 | B MAIL | RIGHT | APP NAME | B TEXT EDITER | LEFT |
| 5 | 7/16 10:05 | A MAIL | RIGHT | APP TYPE | B MAIL | LEFT |
| : | : | : | : | : | : | : |

| LAYOUT ID | SAVED TIME AND DATE | ACTIVATION APP | | PAIR APP | | |
|---|---|---|---|---|---|---|
| | | APP NAME | POSITION | SUBJECT OF LAYOUT DETERMINATION | TYPE/NAME | POSITION |
| 1 | 7/15 16:21 | A BROWSER | LEFT | APP TYPE | MAIL | RIGHT |

| LAYOUT ID | SAVED TIME AND DATE | ACTIVATION APP | | PAIR APP | | |
|---|---|---|---|---|---|---|
| | | APP NAME | POSITION | SUBJECT OF LAYOUT DETERMINATION | TYPE/NAME | POSITION |
| 2 | 7/15 20:56 | A BROWSER | LEFT | APP NAME | A TEXT EDITER | RIGHT |

INFORMATION PROCESSING DEVICE, INFORMATION PROCESSING METHOD, AND COMPUTER-READABLE RECORDING MEDIUM WHICH RECORDS PROGRAM

CROSS-REFERENCE TO RELATED APPLICATIONS

This application is a national stage application of International Application No. PCT/JP2012/060786 entitled "Information Processing Device, Information Processing Method, and Computer-Readable Recording Medium Which Records Program," filed on Apr. 20, 2012, which claims the benefit of the priority of Japanese patent application No. 2011-094263, filed on Apr. 20, 2011, the disclosures of each of which are hereby incorporated by reference in their entirety.

TECHNICAL FIELD

The present invention relates to an information processing device, an information processing method, and a computer-readable recording medium that records a program, which support setting contents to be displayed on a display.

BACKGROUND ART

Information processing devices with multiple window functions, such as portable appliances and personal computers, comprise one or a plurality of display screens. In the use of such information processing devices, a user sometimes manipulates setting a plurality of windows displayed on one or a plurality of screens in a favorable display layout.

However, user's preferences for a window layout vary depending on the situations. For this reason, there is a problem where a user needs to manipulate changing a window layout each time according to the situation of the moment, making the manipulation complex.

A technique, therefore, has been proposed for supporting manipulation of setting a layout for displaying windows for information processing devices with display screens.

For example, Unexamined Japanese Patent Application Kokai Publication No. 2005-12324 discloses a portable appliance that, based on a running application displayed on a first display screen, determines contents to be displayed on a second display screen.

CITATION LIST

Patent Literature

Patent Literature 1: Unexamined Japanese Patent Application Kokai Publication No. 2005-12324.

SUMMARY OF INVENTION

Technical Problem

Nevertheless, there are still insufficiencies in the technique for supporting manipulation of setting a layout for displaying windows for information processing devices with display screens.

For example, the portable appliance described in Unexamined Japanese Patent Application Kokai Publication No. 2005-12324 only displays predetermined contents on the second display screen in predesigned and predetermined situations, being unable to provide flexible setting support tailored to users' needs.

The present invention has been conceived in consideration of the above context, and has an objective of providing an information processing device, an information processing method, and a computer-readable recording medium that records a program, which realize a favorable window layout tailored to users' needs without necessitating complicated manipulation.

Solution to Problem

To achieve the above objective, the information processing device according to a first aspect of the present invention comprises:
  a display that displays one or more windows;
  a controller that controls the display so as to control display of the windows by the display and a layout of the windows; and
  a storage that stores a history of the layout of the windows that is displayed on the display,
    wherein the controller comprises:
    a window controller that generates one or more candidates of the layout of the windows based on the history of the layout of the windows; and
    a display controller that causes the display to display the candidates generated by the window controller,
    the window controller issues an instruction to the display controller to display the windows in a layout selected from the candidates displayed on the display, and
    the display controller causes the windows to be displayed in the selected layout according to the instruction from the window controller.

The information processing method according to a second aspect of the present invention comprises:
  controlling a layout of one or more windows to display the windows;
  storing a history of the layout of the displayed windows;
  generating one or more candidates of the layout of the windows based on the stored history;
  displaying the generated candidates; and
  displaying one or more windows in a layout indicated by a candidate selected from the displayed candidates.

Further, a program stored in a computer-readable recording medium according to a third aspect of the present invention, causes a computer to execute the processing of:
  controlling a layout of one or more windows to display the windows;
  storing a history of the layout of the displayed windows;
  generating one or more candidates of the layout of the windows based on the stored history;
  displaying the generated candidates; and
  displaying one or more windows in a layout indicated by a candidate selected from the displayed candidates.

Advantageous Effects of Invention

The information processing device, the information processing method, and the computer-readable recording medium that records the program, according to the present invention, based on the history of window display layouts, generate candidates of the window layouts and display windows in the layout of a candidate selected from the generated candidates. This realizes a favorable window layout tailored to users' needs without necessitating complicated manipulation.

BRIEF DESCRIPTION OF DRAWINGS

FIG. 3A is a diagram showing an example where an application is displayed on a first touch panel, FIG. 3B is a diagram showing an example where two different applications are respectively displayed on the first and second touch panels, and FIG. 3C is a diagram showing an example where the same application is displayed on the first and second touch panels;

FIG. 7A is a diagram showing a window history list according to Embodiment 1, and FIG. 7B is a diagram showing a layout candidate list according to Embodiment 1;

FIG. 13A is a block view showing a storage of the portable appliance according to Embodiment 2, FIG. 13B is a diagram showing the window history list of FIG. 13A, FIG. 13C is a diagram showing the first layout candidate list of FIG. 13A, and FIG. 13D is a diagram showing the second layout candidate list of FIG. 13A;

DESCRIPTION OF EMBODIMENTS

Figure 1A:
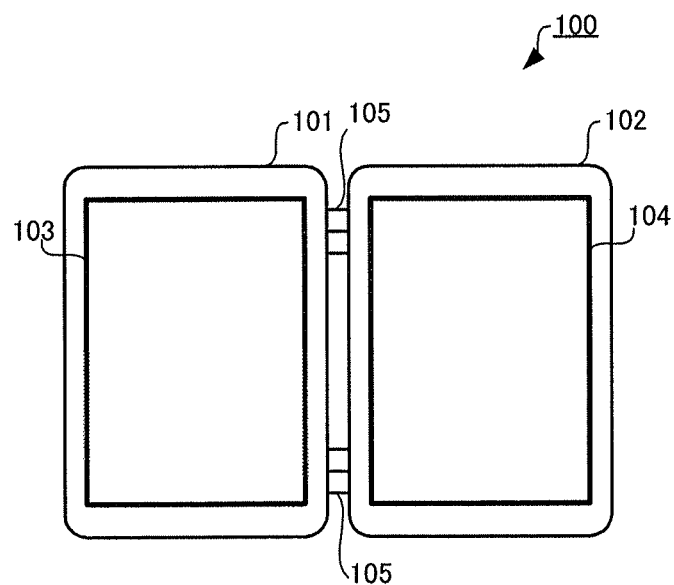
FIG. 1A is a diagram showing the foreside of the portable appliance.

The following will describe the embodiments of the present invention with reference to the drawings. It should be noted that the same or equivalent portions in the drawings are assigned the same signs and numerals.

Embodiment 1

The appearance of a portable appliance 100 (an information processing device) according to Embodiment 1 of the present invention will be described with reference to FIGS. 1A and 1B.

Figure 1B:
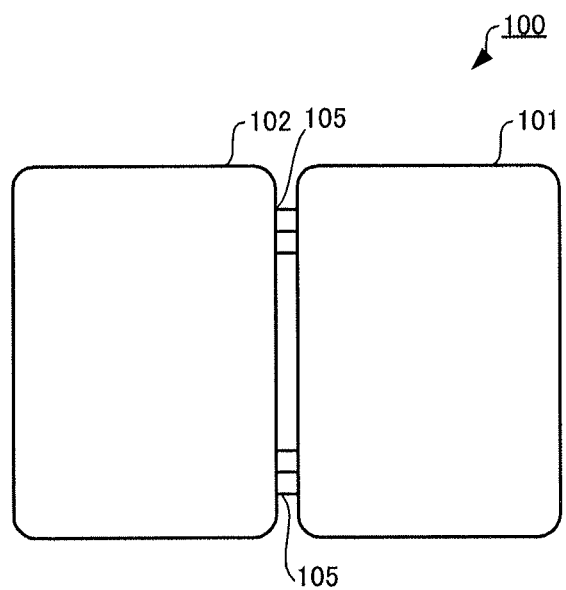
FIG. 1B is a diagram showing the back side of the portable appliance, in terms of appearance of the portable appliance according to Embodiment 1 of the present invention.

FIG. 1A is a diagram showing the foreside of the portable appliance 100, and FIG. 1B is a diagram showing the back side of the portable appliance 100.

As shown in FIGS. 1A and 1B, the portable appliance 100 has two chassis (a first chassis 101, a second chassis 102). The first chassis 101 houses a first touch panel 103. The second chassis 102 houses a second touch panel 104. The first touch panel 103 is positioned at left from user's side. The second touch panel 104 is positioned at right from user's side.

The first chassis 101 and the second chassis 102 are connected via a joint 105.

The joint 105 includes data wires for the first touch panel 103 or the second touch panel 104 to exchange data to and from a controller 205, as will be described hereinafter. The joint 105 possibly also comprises a hinge to make the first chassis 101 and the second chassis 102 foldable.

Figure 2:
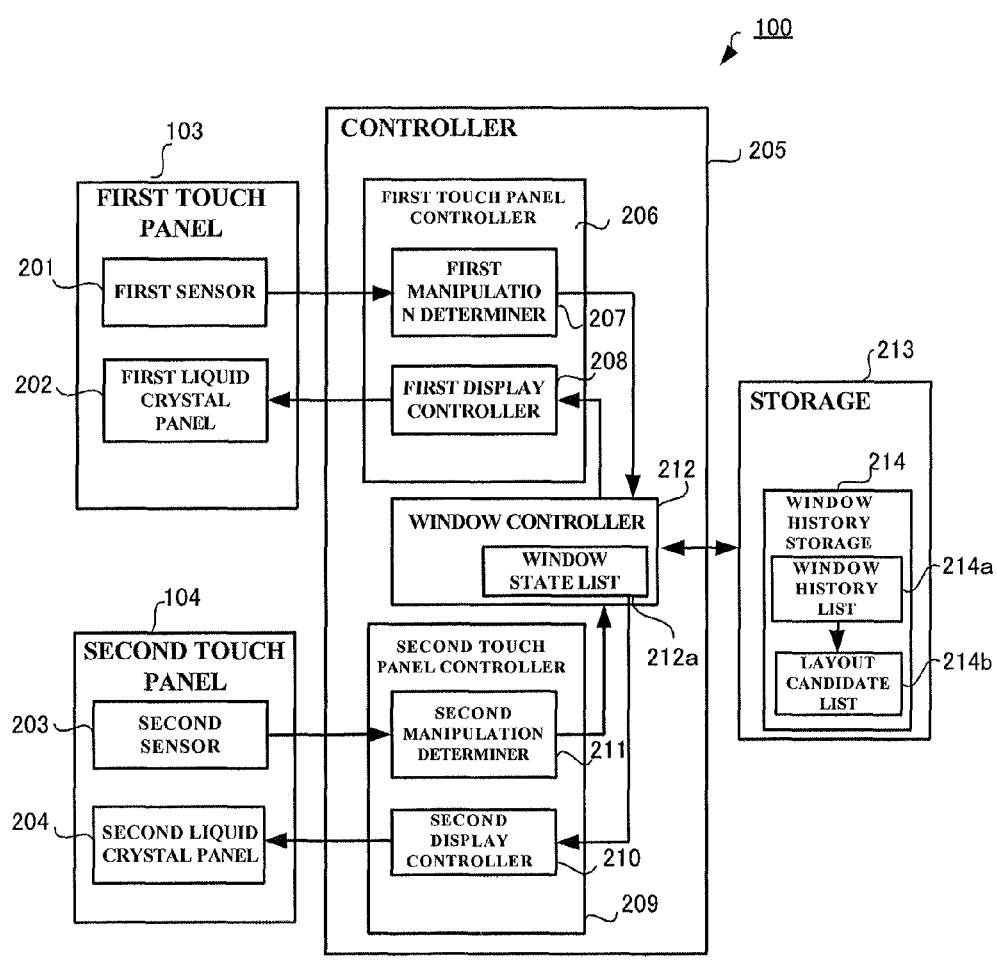
FIG. 2 is a block view showing a configuration of the portable appliance according to Embodiment 1.

Next, the internal configuration of the portable appliance 100 will be described with reference to FIG. 2. The portable appliance 100, as shown in FIG. 2, is configured by a first touch panel 103, a second touch panel 104, a controller 205, and a storage 213.

The first touch panel 103 and the second touch panel 104 are devices, each comprising a function of displaying images on the screen and a function of detecting a position where a user touched on the screen and outputting a signal indicating the detected position.

To realize the above functions, the first touch panel 103 is configured by disposing, in layers, a first liquid crystal panel 202 that displays images designated by the controller 205 on the screen and a first sensor 201 that detects touching and the position of the touching. The first sensor 201 detects a position where a user touched on the screen of the first liquid crystal panel 202, and transfers the detected position to the controller 205.

The second touch panel 104 is, likewise, configured by disposing, in layers, a second liquid crystal panel 204 that displays images designated by the controller 205 on the screen and a second sensor 203 that detects touching and the position of the touching. The second sensor 203 detects a position where a user touched on the screen of the second liquid crystal panel 204, and transfers the detected position to the controller 205.

The controller 205 physically comprises a CPU (Central Processing Unit) or DSP (Digital Signal Processor) and a memory. On the functional side, the controller 205 comprises a first touch panel controller 206, a second touch panel controller 209, and a window controller 212. The controller 205 carries out a variety of processing based on a program stored in the storage 213.

The portable appliance 100 comprises a communicator, not shown, for communicating with other devices via this communicator.

The first touch panel controller 206 controls the first touch panel 103. The first touch panel controller 206 is configured by a first manipulation determiner 207 and a first display controller 208.

The first manipulation determiner 207 receives outputs (signals indicating positions where a user touched) of the first sensor 201 of the first touch panel 103 and identifies manipulation that the user performed to the touch panel 103.

The first display controller 208 receives image data of the images of display subjects from the window controller 212, and controls (drives) the first liquid crystal panel 202 to display the images corresponding to the received image data.

The second touch panel controller 209 controls the second touch panel 104. The second touch panel controller 209 is configured by a second manipulation determiner 210 and a second display controller 211.

The second manipulation determiner 210 receives outputs (signals indicating positions where a user touched) of the second sensor 203 of the second touch panel 104 and identifies manipulation that the user performed to the touch panel 104.

The second display controller 211 receives image data of the images of display subjects from the window controller 212, and controls the second liquid crystal panel 204 to display the images corresponding to the received image data.

The window controller 212 controls windows used by a user for utilizing applications.

The window controller 212 executes an application program stored in the storage 213, and determines display modes of one or a plurality of windows to be displayed based on the processing result, manipulation identified by the first manipulation determiner 207 and manipulation identified by the second manipulation determiner 210. The display modes of windows, here, mean the number of the windows, the layout of each window, and the content displayed on each window. The window controller 212 instructs the first display controller 208 and the second display controller 211 to display windows in the determined display modes.

The storage 213 is physically configured by a flash memory, ROM (Read Only Memory), RAM (Random Access Memory), hard disk, and the like, and functionally comprises a window history storage 214. The storage 213 stores data designated by a controller 205. The controller 205 reads out the designated data from the storage 213.

Figure 3A:
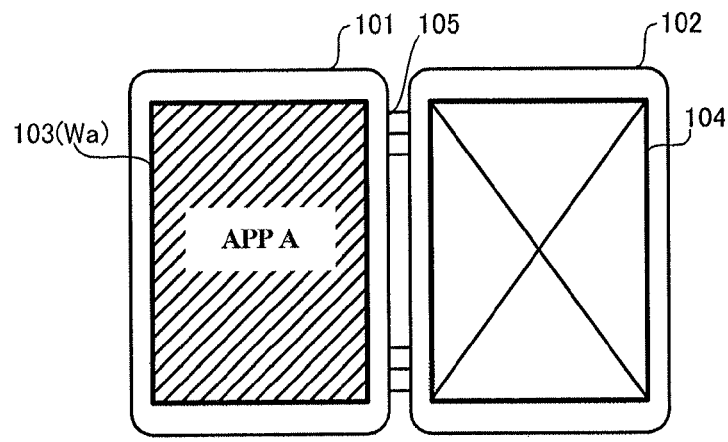
FIGS. 3A to 3C show the display screens according to Embodiment 1 as examples.
Figure 3B:
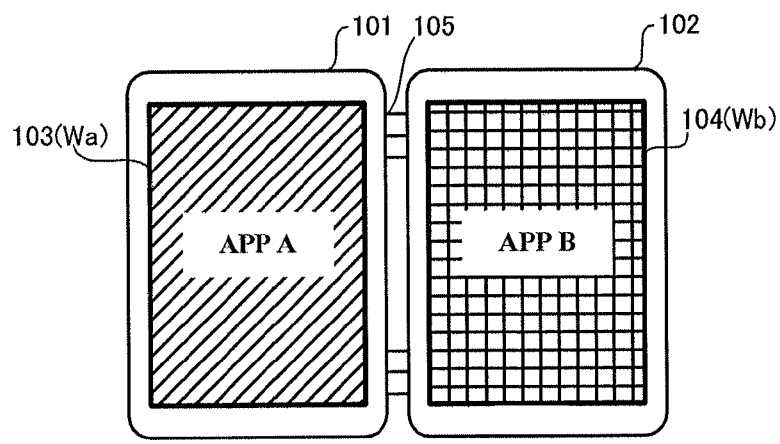
Figure 3C:
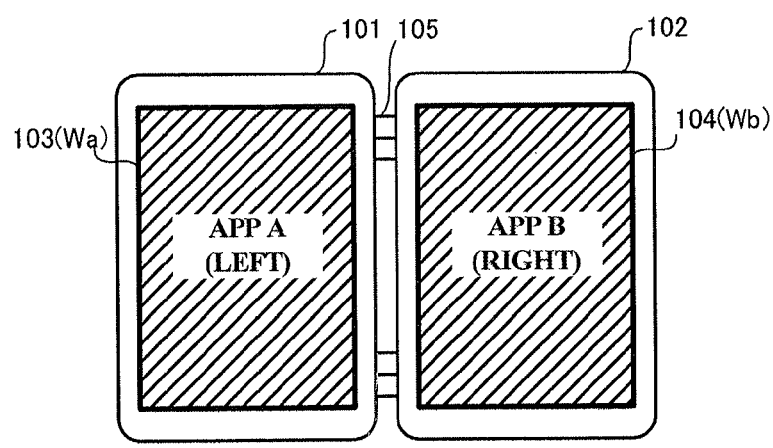
Figures 4, 5:
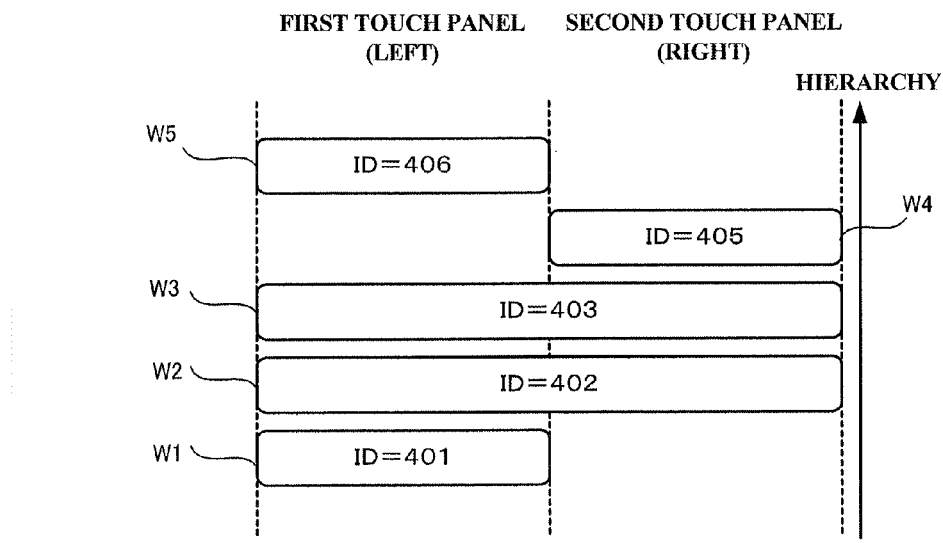
FIG. 4 is a diagram showing a conceptual view of window management according to Embodiment 1.
FIG. 5 is a diagram showing an example of a window state list according to Embodiment 1.

The following will describe, with reference to FIGS. 3A to 4, how windows displayed on the first liquid crystal panel 202 and the second liquid crystal panel 204 are controlled in the portable appliance 100 having the above-described configuration.

It should be noted that a case where one window is displayed on one screen will be described for easy understanding.

FIGS. 3A to 3C show display examples of touch panels 103 and 104 when a user is executing application A. The first touch panel 103 displays the display image of application A. In this case, there are possibly considered three patterns of contents to be displayed on the second touch panel 104.

The first pattern is a case where a user desires only images accompanying the behavior of application A to be displayed in window Wa displayed on the first touch panel 103 (displayed on the whole screen of the first touch panel 103 in FIG. 3A) without any other special contents to be displayed. In this case, arbitrary contents are displayed on the second touch panel 104. The second touch panel 104 is possibly turned off, displays a black screen, or displays a default screen (a wall paper, a screen saver, or the like) (FIG. 3A). Alternatively, a window of an arbitrary application is possibly displayed.

The next pattern is shown in FIG. 3B where the second touch panel 104 displays window Wb displaying images according to the behavior of application B that is used in relation with application A. In this case, a user manipulates application A while referring to the screen of application B displayed on the second touch panel 104. For example, when a user creates a mail based on information that the user searched on the Internet, the user manipulates a mailer (application A) while seeing the window Wb of a browser (application B). Hereinafter, as in this case, when windows Wa and Wb of two applications are displayed on respective screens, it is referred to as a two app display. Moreover, such a window display layout is referred to as a two app display layout.

The last pattern is shown in FIG. 3C where the window Wa of application A is displayed not only on the first touch panel 103, but also on the second touch panel 104. In this case, the first touch panel 103 displays the left half of the window Wa of application A and the second touch panel 104 displays the right half of the window Wb. Alternatively, two windows, which display application A, are respectively displayed on the first touch panel 103 and the second touch panel 104. A user uses the window Wa displayed on the two screens to manipulate application A.

To display one or a plurality of windows on two screens as shown in FIGS. 3A to 3C, the window controller 212 defines the following hierarchical structure of windows. Windows W1 to W5 to be displayed on the left screen (first touch panel 103) and the right screen (second touch panel 104) will be defined as shown in FIG. 4.

In FIG. 4, windows W1 to W5 are represented by laterally long rectangles with rounded corners. Windows W1 to W5 are each assigned ID (Identification) numbers. Such ID numbers are indicated by numerical values within the rounded corner rectangles.

Windows W1 to W5 are laid out on the right screen (ID: 406, 401), the left screen (ID: 405), or over both left and right screens (ID: 403, 402).

Windows W1 to W5 are respectively assigned hierarchical values 1 to 5. One or a plurality of windows among windows W1 to W5, configure a hierarchical structure. The highest level window in the hierarchy (with the largest hierarchical value) for each screen is displayed on the screen. In this way, the state of a window, which is defined by the place and hierarchy occupied by the window, is referred to as the layout of that window. Moreover, the layout of a window in the highest layer displayed on each screen is referred to as the display layout (a layout displaying a window).

In the example of FIG. 4, since a window with ID: 406 is in the highest layer on the left screen, window W5 with ID: 406 is displayed on the left screen. Whereas, since a window with ID: 405 is in the highest layer on the right screen, window W4 with ID: 405 is displayed on the right screen.

This hierarchical structure changes when a window is disposed; a new application is activated; or a focus is switched to a lower level window, according to the manipulation of a user or the processing result of an application. When and how the hierarchical structure changes is determined by the system setting.

When the hierarchical structure changes, a window which has come to be in the highest layer of the renewed hierarchical structure is displayed on each screen.

For example, when window W5 with ID: 406 is disposed from the state of FIG. 4, the left half of window W3 with ID: 403, which is located in the next highest layer to the window with ID: 406, is displayed on the left screen. As window W4 with ID: 405 is displayed on the right screen, the right half of window W3 with ID: 403 is still hidden.

The hierarchical structure of FIG. 4 is, specifically, defined by a window state list 212a shown in FIG. 5. Each row of the window state list 212a has the state of corresponding window registered therein. Each column of the window state list 212a indicates the details of each item for defining the state of a window.

Columns of the window state list 212a are: window ID, the position of window, the hierarchy of window, application ID, the name of application, the type of application, and activation source application ID that induces the application.

The window ID is an identifier for identifying a corresponding window.

The position of window represents a screen/screens on which a window corresponding to each row is positioned. The position of window takes any one of three values: RIGHT, LEFT, FULL. If the value is RIGHT, the corresponding window is displayed only on the right screen; LEFT, on the left screen; and, FULL, on both left and right screens.

The hierarchy of window represents a position, in the hierarchical structure shown in FIG. 4, occupied by the corresponding window. The hierarchy of window is defined as a positive value. The larger this numerical value is, the higher in the hierarchy the corresponding window is positioned.

Each window displays the processing result of the corresponding application. Information about this corresponding application is indicated, in the window state list 212a, by application ID, application name, application type, and activation source application ID that induces the application.

The application ID is an identifier that uniquely represents an application displayed on the window.

The application name indicates the name of an application displayed on the window.

The application type indicates to which classification an application displayed on the window belongs. Every application included in the system belongs to any one of predefined classifications. The application type possibly has a value of mailer, launcher, browser, or the like. In the example of FIG. 5, application name "A BROWSER" and application name "B BROWSER" are both applications of the classification of "BROWSER."

The activation source application ID that induces the application is the ID (identifier) of an application that has activated the application displayed on the window.

Hereinafter, when there is a relationship where a given application is activated by another application, there is said to be an activation association between the two applications. Further, such an activation source application is referred to as the activation app (main application) and the activated application is referred to as the pair app (pair application).

The application ID has a value of ID of an activation source app or NULL (a value when there is no activation source app). For example, since HOME app with application ID: 5012 in FIG. 5 is an application that is started up as a home screen when starting up the portable appliance 100 and a standby state screen, HOME app does not have an activation app.

In the example of FIG. 5, B MAIL (ID: 5014) is activated by A BROWSER (ID: 5013). Thus, the activation source application ID of B MAIL (ID: 5014) is 5013 that represents A BROWSER. There is an activation association between A BROWSER and B MAIL, with A BROWSER being the activation app, B MAIL being the pair app.

The window state list 212a is stored in the internal memory of the window controller 212. When the layout of each window represented by FIG. 4 changes, the window state list 212a is updated, overwritten and stored.

The window controller 212 supports a user to change the layout of windows to a favorable display layout without performing complicated manipulation. The following will describe processing that the window controller 212 performs for supporting a user with reference to FIGS. 6 to 9.

Figure 6:
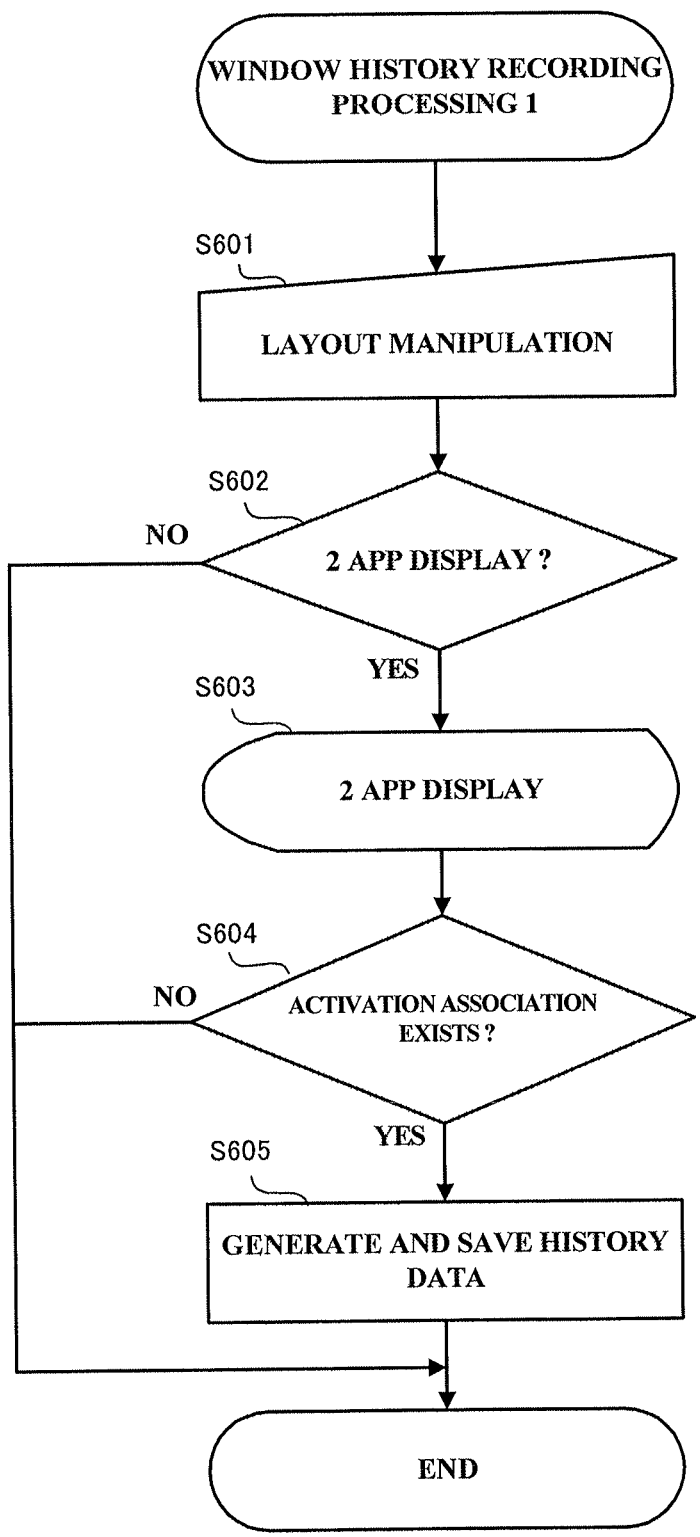
FIG. 6 is a flowchart showing window history recording processing according to Embodiment 1.
Figure 8:
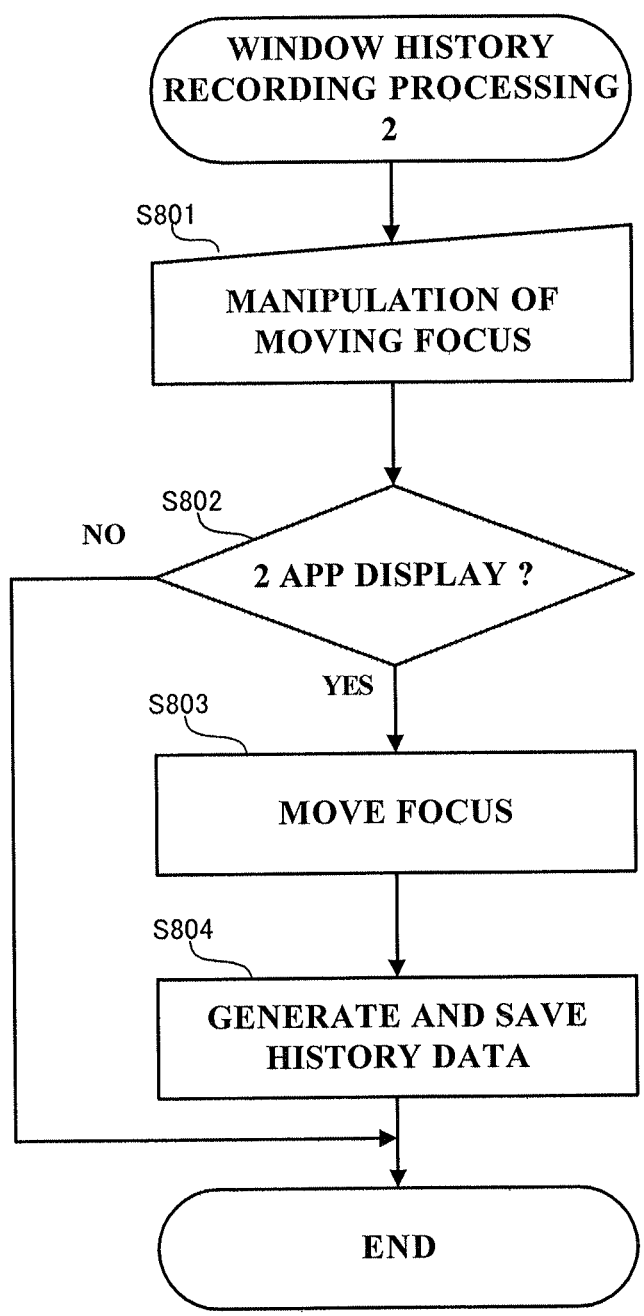
FIG. 8 is a flowchart showing window history recording processing according to Embodiment 1.

When the portable appliance 100 is activated and a window is displayed, window history recording processing 1 starts (FIG. 6). When a user performs manipulation of converting the display layout of the window (step S601), the window controller 212 determines whether the display layout of the window after the change is a two app display layout (FIG. 3B) or not (step S602). If it is not a two app display layout, (step S602: NO), the window history recording processing 1 ends.

If the display layout of the window after the change is a two app display layout (step S602: YES), the window controller 212 updates the window state list 212a stored in the internal memory, and displays the screen in the changed display layout (step S603). Here, if the manipulation at step S601 is a manipulation for generating a new window, information relating to the new window is added to the window state list 212a. If the manipulation at step S601 is a manipulation for changing the layout of existing windows, the positions of the windows after changing the layout and hierarchical values of the windows are updated.

Next, the window state list 212a is referred to so as to determine whether there is an activation association between the two applications that are displayed in a two app display (step S604). If there is an activation association (step S604: YES), data of the changed display layout of the windows is generated as history data, registered in a window history list 214a, and stored in the window history storage 214 (step S605).

Here, the window history list will be described with reference to FIG. 7. Each row of the window history list 214a has display layout information of windows in a two app display layout that was registered at step S605 as a history. Each column of the window history list indicates the details of each item for defining the state of the two app display layout.

Columns of the window history list 214a are layout ID, saved time and date, app name of activation app, position of activation app, subject of layout determination of pair app, type/name of pair app, and position of pair app.

The layout ID is an identifier for uniquely defining the display layout of windows registered in each row.

The saved time and date represents time and date when the display layout of the windows of that row was registered.

The app name of activation app represents the name of the activation app between the two applications displayed in the two app display layout at step S603.

The position of activation app represents which of left and right screens the activation app is displayed in the two app display layout at step S603. The position of activation app takes any one value of RIGHT, LEFT, and FULL. If the value is RIGHT, the window of corresponding activation app is displayed only on the right screen; LEFT, on the left screen; and, FULL, on both screens.

The subject of layout determination of pair app is a value for defining whether a method of identifying the pair app is based on an application classification or an application name. When the pair app is identified by the application classification, the value is "APP TYPE;" when the pair app is identified by the application name, the value is "APP NAME."

The type/name of pair app has, when the value of the subject of layout determination is "APP TYPE," a value of information that identifies the classification of the pair app (the name of the application classification). When the value of the subject of layout determination is "APP NAME," the type/name of pair app has a value of the name of the application that identifies the pair app.

The position of pair app represents which of left and right screens the pair app is displayed in the two app display layout at step S603. The position of pair app takes any one value of RIGHT, LEFT, and FULL. If the value is RIGHT, the window of the corresponding pair app is displayed only on the right screen; LEFT, on the left screen; and, FULL, on both screens.

Each row of the window history list 214a represents the layout of the windows of two applications that are displayed in the two app display at step S603 and have an activation association which are respectively displayed on the left and right screens. As this window display layout is purposely set by user manipulation, the window display layout is assumed as a favorable display layout for the user when using the activation app. Thus, in this embodiment, this window display layout is registered as a candidate of a window display layout in the window history list 214a so that the changed window display layout is easily reproduced when the user starts up the activation app next time.

This description continues referring back to FIG. 6.

After the window history list 214a is generated and saved (after step S605), or there is no activation association (step S604: NO), the processing ends.

The window history recording processing 1 of FIG. 6 is not the only processing that registers a window display layout as a candidate in the window history list 214a. As another example of registering a window display layout, window history recording processing 2 will be described with reference to FIG. 8.

The window history recording processing 2 is characterized in that, when a user manipulates moving a focus between windows of a two app display layout, the display layout of that time is registered in the window history list. Such manipulation of moving a focus is not a manipulation of changing window display layout itself. Thus, in the example that has been described so far, the window display layout at the time of manipulation for moving a focus, does not become a candidate of a window display layout, and, so, this window display layout is not registered in the window history list 214a in the window history recording processing 1. However, if a user is frequently moving a focus in a two app display state, which probably means that the user is required to work by simultaneously using the displayed two applications. Thus, in the window history recording processing 2, such a window display layout is registered in the window history list 214a. In this way, the same window display layout is easily reproduced when starting up the applications thereafter.

The window history recording processing 2 starts when a user manipulates moving a focus to an unfocused window. When the user performs manipulation of moving a focus (step S801), the window controller 212 refers to the window state list 212a and determines whether the present window layout is a two app display or not (step S802). If the window layout is not a two app display (step S802: NO), the window layout is not a processing subject in the window history recording processing 2, then, the processing ends.

If the window layout is a two app display (step S802: YES), first, the processing of moving the focus to a window designated by the user is performed (step S803).

Next, data for window history list 214a for newly registering this window display layout is generated and registered in the window history list 214a, and this window history list 214a is overwritten and stored in the window history storage 214 (step S804).

Then, the window history recording processing 2 ends.

Figure 9:
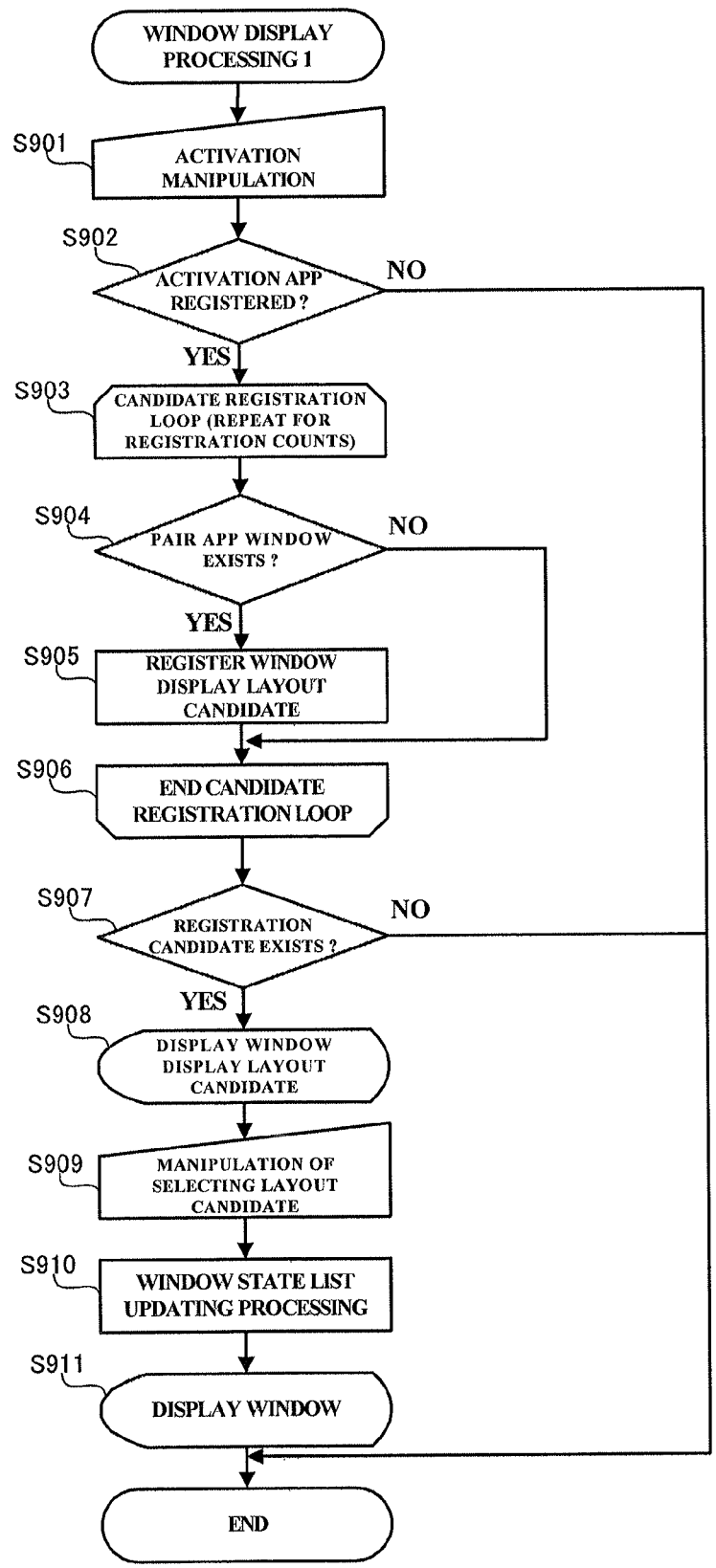
FIG. 9 is a flowchart showing window display processing according to Embodiment 1.
Figure 10:
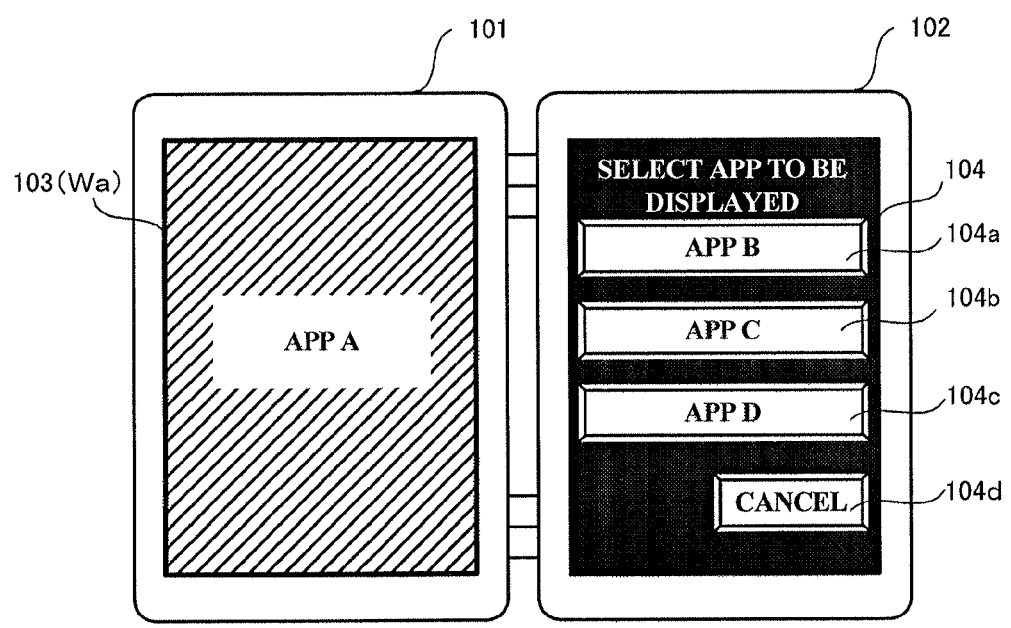
FIG. 10 is a diagram showing an example of a window display selection screen according to Embodiment 1.

The following will describe processing that is performed for displaying windows in a favorable window display layout selected by a user using the window history list 214a when the user manipulates activating the application (window display processing 1) with reference to FIGS. 9 and 10. When a user manipulates activating (executing) an application, the window controller 212 starts the window display processing 1.

In FIG. 9, when a user manipulates activating an application (step S901), first, whether the application is registered in the activation app column in the window history list 214a is determined (step S902). If the application is not in the activation app column (step S902: NO), then, the processing ends. In this case, the window is displayed based on the default setting.

If the application is registered in the activation app column of the window history list 214a (step S902: YES), all rows with the application registered in the activation app column are extracted from the window history list 214a. Then, processing of a candidate registration loop (steps S903 to S906) is executed for each extracted row. As an example, if the activation app is A BROWSER, corresponding two rows (rows with layout ID values "1" and "2") are extracted from the window history list 214a, and processing of the candidate registration loop is executed for these two rows.

In the candidate registration loop, first, whether a pair app window of a row that is a subject of processing has already been registered in the window state list 212a or not is determined (step S904). In the above example, the pair apps of the above two rows are "MAIL" and "A TEXT EDITOR," thus, whether these pair apps are registered in the window state list 212a is determined.

If the window of the pair app is not registered in the window state list 212a (step S904: NO), the pair app has not yet been activated. In this case, the window layout does not become a new window layout candidate (window display layout candidate) in this embodiment. Then, the processing of this loop ends for that row. In the above example, as "A TEXT EDITOR" is not registered in the window state list 212a, processing of this loop for the row where pair app is A TEXT EDITOR ends.

If the pair app is registered in the window state list 212a (step S904: YES), the pair app has already been activated. In such a case, the window display layout is regarded as a window display layout candidate, and the corresponding row of the window history list 214a is registered, as is, in a layout candidate list 214b (step S905). In the above example, as "MAIL" has already been registered in the window state list 212a, the pair app has already been activated. Thus, the layout of a window where the pair app is MAIL is regarded as a window display layout candidate, and, as shown in FIG. 7B, the corresponding row of the window history list 214a is registered in the layout candidate list 214b.

When the processing of step S905 ends, processing for a row that was the subject of processing ends. Then, the candidate registration loop continues with the following row becoming the subject of processing. When the processing completes for all extracted rows, processing of the candidate registration loop ends (step S906).

When processing of the candidate registration loop ends, the window controller 212 determines whether the window display layout candidate is registered in the layout candidate list 214*b* (step S907). When no window display layout candidate is registered (step S907: NO), the window display processing 1 ends.

If any window display layout candidate is registered in the layout candidate list 214*b* (step S907: YES), the registered window display layout candidate is displayed on the second touch panel 104 (step S908). The user selects one of the displayed window display layout candidates by manipulating the second touch panel 104.

When the user manipulates selecting one of the displayed window display layout candidates (step S909), the window controller 212 updates the window state list 212*a* to facilitate reproducing the window display layout of the selected candidate (step S910).

In particular, the window controller 212 changes the values of the positions of windows relating to the candidate among windows W1 to W5 registered in the window state list 212*a* to the values of the positions matching the window display layout candidate in the layout candidate list 214*b*. Further, the window controller 212 changes the hierarchical values of those windows to values corresponding to the uppermost level of the positions. Other values of the window layout and the like will not be changed.

Then, the window controller 212 issues an instruction to the first display controller 208 and the second display controller 211 to update the screens based on the window state list 212*a* that has been updated by the above change. As a result, the windows are displayed in the window display layout selected by the user (step S911).

Here, the following will describe the screens to be displayed on the first touch panel 103 and the second touch panel 104 when a user selects a window display layout candidate at the processing of step S908 with reference to FIG. 10.

When a user activates application A (hereinafter, App A), the window Wa of App A is temporarily displayed on the first touch panel 103. At the same time, the second touch panel 104 displays "APP B," "APP C," and "APP D" as window display layout candidates. FIG. 10 shows screens displayed when App B, App C, and App D are registered as pair apps of App A in the layout candidate list 214*b*. In this case, "APP B," "APP C," or "APP D" is selected when a user touches any one of buttons 104*a* to 104*c* indicating App B, App C, and App D that are window display layout candidates.

For example, if the user selects App B, the windows of App A and App B are displayed in the window display layout of the corresponding candidate. In particular, the window controller 212 extracts information about the corresponding window display layout candidate from the layout candidate list 214*b* of the window history storage 214. Then, the window controller 212 updates the window state list 212*a* of the window controller 212 to match the window display layout. The window controller 212 instructs the first display controller 208 and the second display controller 211 to display screens according to the updated window state list 212*a*.

It should be noted that when a plurality of window display layout candidates having app B as pair app are registered in the layout candidate list 214*b*, the layout that is most recently registered in the window history list 212*a* is selected.

As described above, according to the portable appliance 100 of Embodiment 1, a window display layout in which a user simultaneously used an activation app and a pair app in the past is reproduced without complicated manipulation.

As a touch panel of Embodiment 1, touch panels of known types, such as resistive touch panels, surface capacitive touch panels, and projected capacitive touch panels, are possibly used.

Further, the touch panel of Embodiment 1 is possibly a multi-touch panel that allows touch input by gestural manipulation with two fingers.

Embodiment 2

The following will describe Embodiment 2 of the present invention. Embodiment 2 is characterized in that, when a pair app is not registered in the window state list 212*a*, the pair app is newly activated to display the window of the pair app.

With regard to Embodiment 2, the appearance of the portable appliance, configuration, screen layout, the structures of window state list and window history list, the recording processing of the window history list (window history recording processing 1 and 2) are the same as Embodiment 1 (FIGS. 1 to 8).

The following will describe processing (window display processing 2), in Embodiment 2, for displaying a window in a favorable window display layout selected by a user using a window history list when the user manipulates activating an application, with reference to FIGS. 11, 12, and 13A to 13D.

Figure 11:
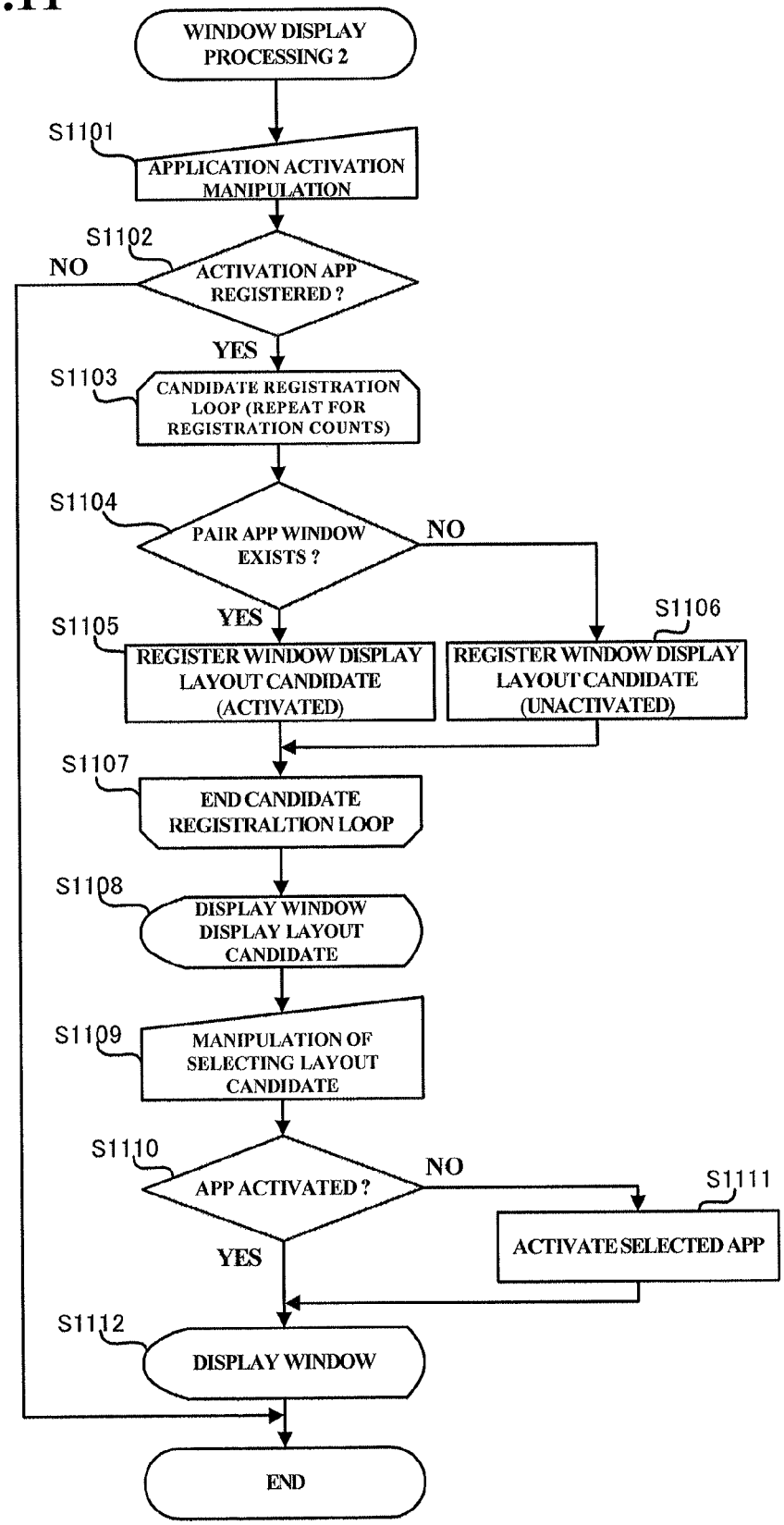
FIG. 11 is a flowchart showing window display processing according to Embodiment 2 of the present invention.

In FIG. 11, when a user manipulates activating an application (step S1101), the window controller 212 executes window display processing 2.

In the window display processing 2, steps from the start of processing until it is determined at the candidate registration loop (steps S1101 to S1104) whether the window of the pair app has already been registered in the window state list 212*a* are the same as those in the window display processing 1 (steps S901 to S904).

Whereas, the window display processing 2 is different from the window display processing 1 in processing when the window of a pair app of a row that is a processing subject is not registered in the window state list 212*a* (step S1104: NO). That is, in the window display processing 2, this window display layout is registered in a second layout candidate list 214*c* shown in FIGS. 13A and 13D as a window display layout candidate of an unactivated pair app (step S1106).

Further, if the window of the pair app of the row is registered in the window state list 212*a* (step S1104: YES), the window display layout is registered in the first layout candidate list 214*b* shown in FIGS. 13A and 13C as a window display layout candidate of an activated pair app (step S1105).

The candidate registration loop ends when the loop processing has been executed for all the rows extracted from the window history list 214*a* shown in FIGS. 13A and 13B (step S1107). When the loop ends, window display layout candidates registered in the first layout candidate list 214*b* and the second layout candidate list 214*c* are displayed on the screen next (step S1108). The user selects one of the displayed candidates by manipulating the second touch panel 104.

Figure 12:
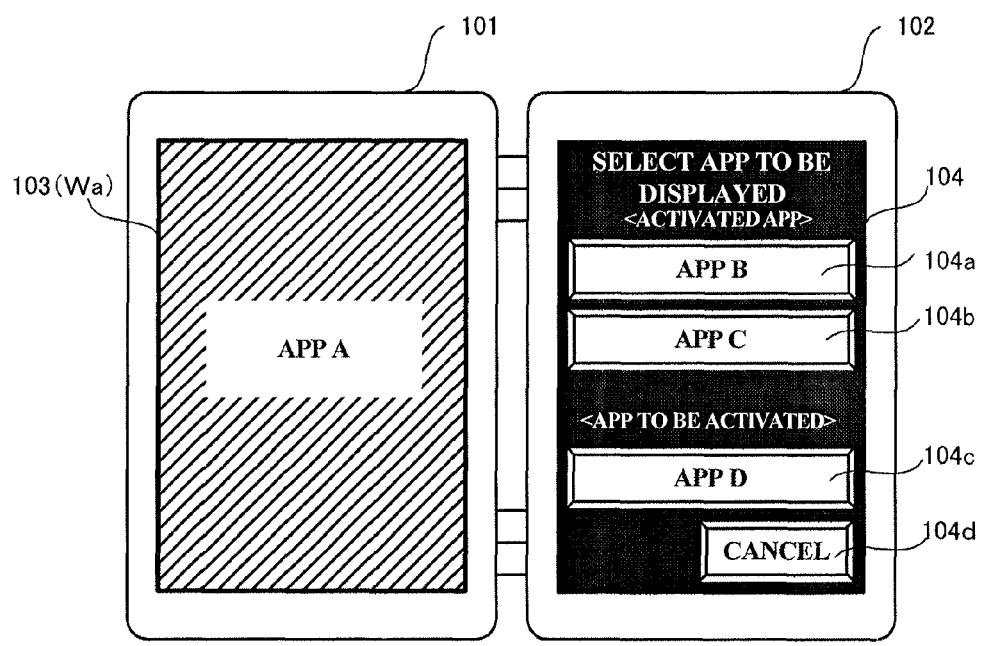
FIG. 12 is a diagram showing a window display selection screen according to Embodiment 2.

Here, window display layout candidates corresponding to activated pair app 104*a*, 104*b*, and unactivated pair app 104*c* are distinctively displayed as shown in FIG. 12. It should be noted that, unlike the window display processing 1, in the window display processing 2, a window display layout candidate always exists if an activation app is registered in the window history list 214*a*. Therefore, the window display processing 2 does not determine whether there is a window display layout candidate (step S907).

When a user selects one of the window display layout candidates using the displayed screen (step S1109), it is determined whether the pair app of the selected window display layout candidate has been activated yet (step S1110).

If the pair app of the window display layout candidate that the user selected at step S1109 has not been activated (step S1110: NO), the pair app is newly activated (step S1111).

If the pair app selected by the user has already been activated (step S1110: YES), or has not been activated but is newly activated (step S1111), the windows of the activation app and the pair app are displayed according to the layout content of the selected window display layout candidate (step S1112). Then, the window display processing 2 ends.

The screen that a user uses for selecting one of the window display layout candidates at step S1108 will be described with reference to FIG. 12.

When a user activates application A (App A), the window of App A is temporarily displayed on the first touch panel 103. At the same time, the second touch panel 104 displays a screen used for selecting a window display layout candidate (step S1108). Here, corresponding pair apps are distinctively displayed as the activated candidates and the unactivated candidates. The screen is the same as FIG. 10 for other parts.

In the example of FIG. 12, App B and App C indicated as pair apps 104a and 104b are activated, and displayed in button shapes under the field displayed as <ACTIVATED APP>. On the other hand, App D indicated as pair app 104c is an unactivated application, and displayed in a button shape under the field displayed as <APP TO BE ACTIVATED>. By touching any one of the displayed buttons, the user selects the window display layout candidate corresponding to the pair app.

For example, if the user selects App B (pair app 104a), windows Wa and Wb of App A and App B are displayed in the window display layout of the corresponding window display layout candidate. It should be noted that, if a plurality of window display layout candidates having App B as pair app are registered in the first layout candidate list 214b, a window display layout candidate that is most recently registered in the window history list 214a is selected as a new window display layout.

Further, if App D (pair app 104 c) is selected, App D is newly activated. App A and App D are displayed in a window display layout that is a window display layout candidate having App D as pair app and has been most recently registered in the window history list 214a among the window display layout candidates registered in the layout candidate list 214c.

As described above, according to the portable appliance 100 of Embodiment 2, a display layout in which a user simultaneously used an activation app and a pair app in the past, is reproduced without complicated manipulation. Further, even the pair app has not been activated yet, the pair app is automatically activated and displayed.

In Embodiment 2, if the layout candidate list 214b has a plurality of window display layout candidates corresponding to the pair app of the selected window display layout candidate, a window display layout candidate that is registered most recently in the window history list 214a is selected, while the selecting method is not limited to this. As another selection method, there is considered a configuration that allows a user to further select a favorable window display layout from the plurality of window display layout candidates. Further, a priority is possibly defined for the plurality of window display layout candidates, and a window display layout candidate with the highest priority is possibly selected automatically. In such a case, the following examples are considered as criteria for defining this priority:

1: accumulated time of time during which each window display layout candidate is being displayed;

2: accumulated counts a user manipulated in a display state of each window display layout candidate; and 3: accumulated counts a user manipulated for changing each window display layout candidate.

Embodiment 3

The following will describe Embodiment 3 of the present invention. Embodiment 3 is characterized in that window display layout candidates are generated according to window layout templates that have been recorded in the portable appliance in advance.

Figure 14:
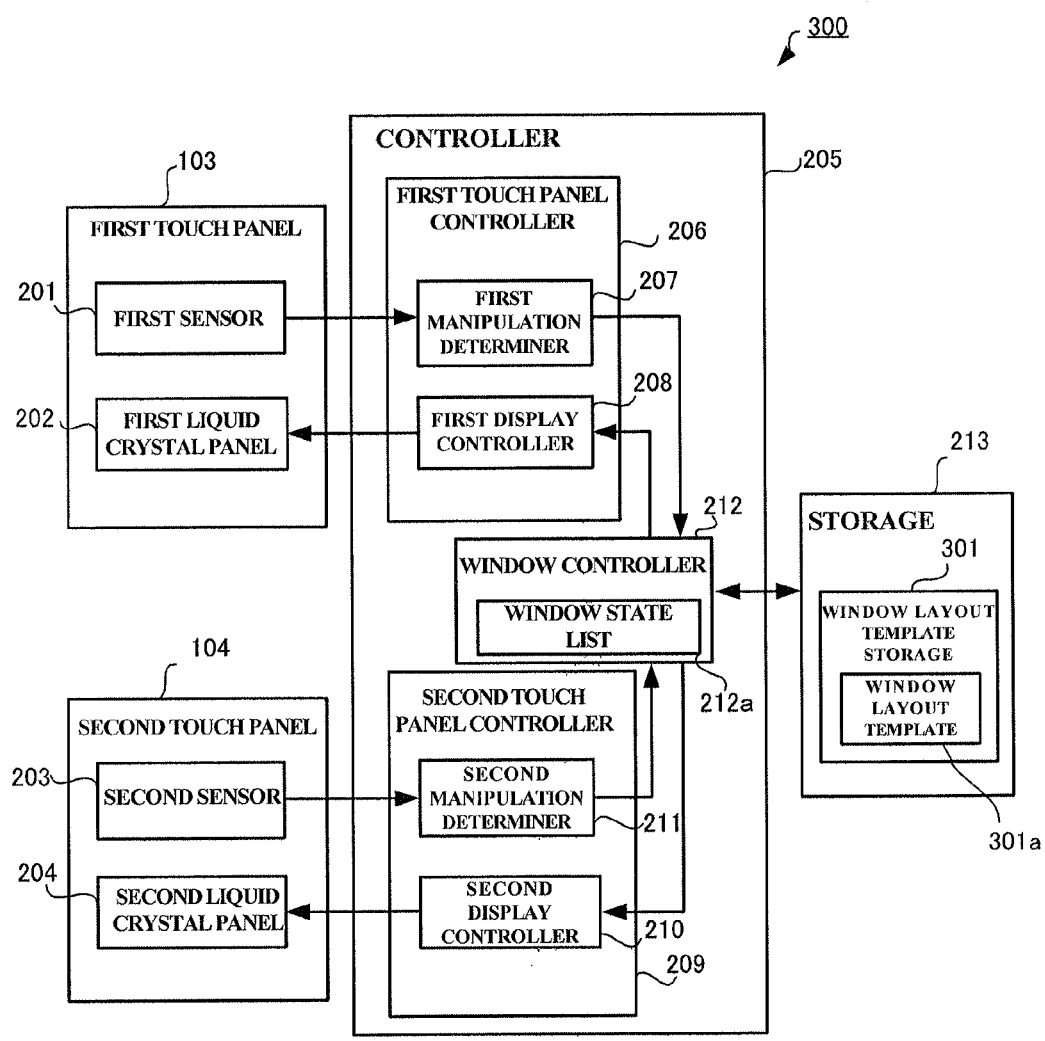
FIG. 14 is a block view showing a configuration of the portable appliance according to Embodiment 3 of the present invention.

The configuration of a portable appliance 300 according to Embodiment 3 is different from those of Embodiments 1 and 2 in having a window layout template storage 301 in the storage 213 (FIG. 14). The window layout template storage 301 stores a window layout template 301a as will be described hereinafter. The window layout template 301a has templates of predefined window display layouts registered therein.

The behavior of the portable appliance 300 of Embodiment 3 will be described with reference to FIGS. 15 to 17.

Figure 15:
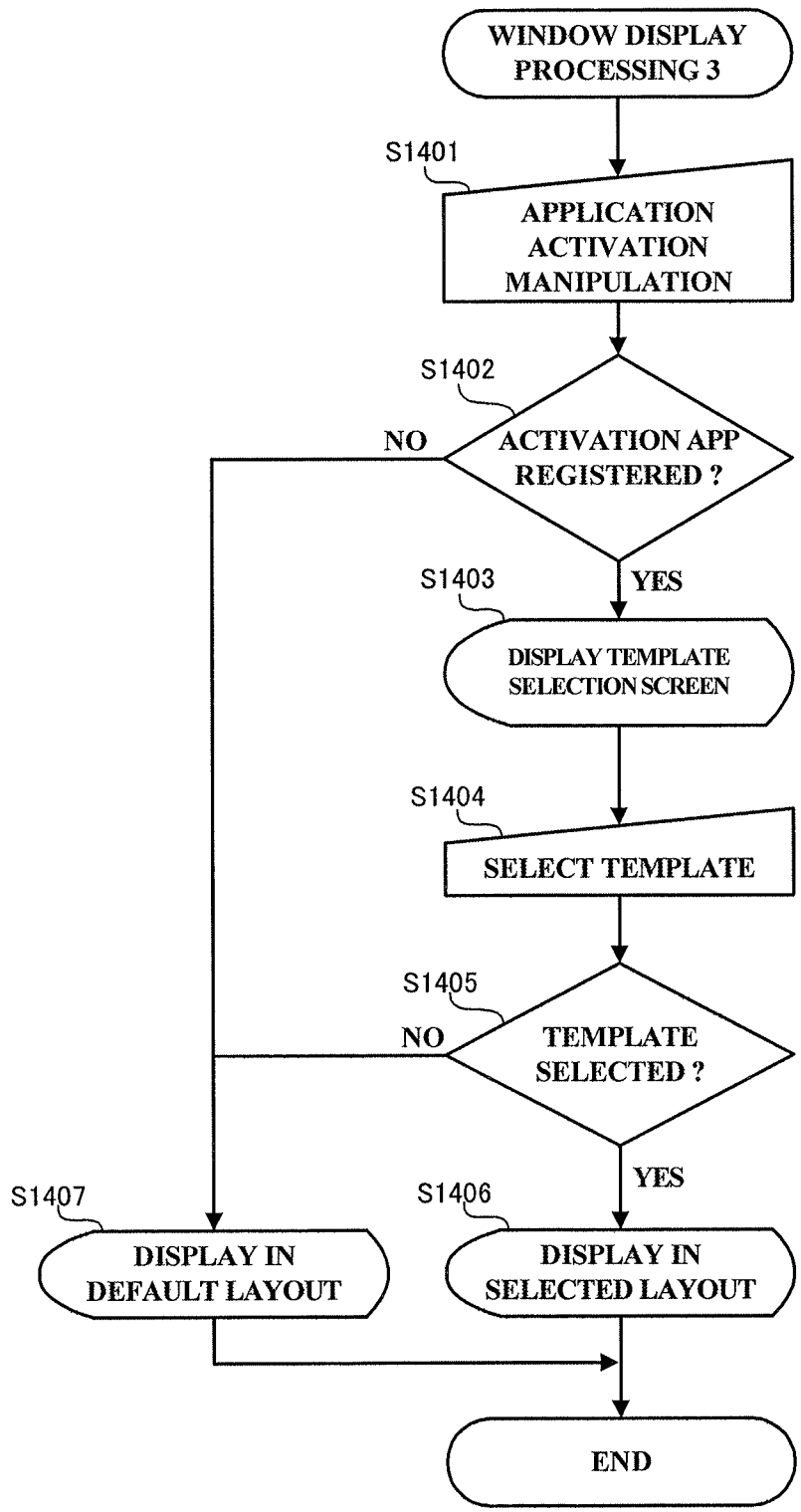
FIG. 15 is a flowchart showing window display processing according to Embodiment 3.

In FIG. 15, if a user manipulates activating an application of the portable appliance 300, window display processing 3 starts (step S1401). Then, the window controller 212 determines whether that application has been registered as an activation app in the window layout template 301a (step S1402).

Here, the window layout template 301a will be described using FIG. 16.

Figure 16:
FIG. 16 is a diagram showing an example of a window layout template according to Embodiment 3.

The window layout template 301a has a structure as shown in FIG. 16. Each row of the window layout template 301a has a window display layout candidate for each combination of an activation app and a pair app registered therein as a template. Each column of the window layout template 301a indicates the details of each item for defining candidates of the window display layout, which includes layout ID, app name of activation app, position of activation app, app name of pair app, and position of pair app.

For example, FIG. 14 shows a window layout template 301a, assuming a case where B TEXT EDITOR activates B BROWSER and both applications are simultaneously used. Here, a row that defines B TEXT EDITOR as the activation app, B BROWSER as the pair app, and the window display layout of the B TEXT EDITOR and B BROWSER, is registered with layout ID "5" in the window layout template 301a.

The layout ID is an ID (identifier) that uniquely represents each row of the window layout template 301a.

The app name of activation app is a name that uniquely represents an activation app corresponding to the window display layout candidate of that row.

The position of activation app, in the window display layout candidate of that row, indicates which part on the screen the window of the activation app is displayed. The position of activation app possibly takes a value of one or a combination of: RIGHT, LEFT, RIGHT_UP, LEFT_UP, RIGHT_DOWN, LEFT_DOWN, FULL and the like. This value being, for example, "LEFT, RIGHT_UP," means that, in the window display layout candidate of that row, the window of the activation app is displayed on the left screen and the upper portion of the right screen.

The application name of pair app, in the window display layout candidate of that row, indicates the name of application (pair app) that is activated by an activation app and simultaneously used in combination with the activation app.

The position of pair app indicates, in the window display layout candidate of that row, which part on the screen the window of the pair app is displayed. The position of the pair app possibly takes a value of one or a combination of: RIGHT, LEFT, RIGHT_UP, LEFT_UP, RIGHT_DOWN, LEFT_DOWN, FULL, and the like. This value being, for example, "RIGHT_DOWN," means that, in the window display layout candidate of that row, the window of the pair app is displayed on the lower portion of the right screen.

This description continues referring back to FIG. 15. If an application that was newly activated by a user is not registered in the column of activation app in the window layout template 301*a* (step S1402: NO), the window of the activation app is displayed in a default window display layout (step S1407).

If an application that was activated by a user is registered in the column of activation app of the window layout template 301*a* (step S1402: YES), window display layout candidates having that application as an activation app are extracted from the window display layout candidates registered in the window layout template 301*a*.

Then, the extracted window display layout candidates are displayed on the screen (step S1403). The user selects one of the displayed window display layout candidates by manipulating the touch panel.

When the user manipulates using the displayed screen (step S1404), the window controller 212 determines whether the user performed manipulation of selecting a window display layout candidate or not (step S1405).

If the user cancelled without performing manipulation of selecting a window display layout candidate (step S1405: NO), the application is displayed on a window of a general window display layout (a default setting) (step S1407).

Whereas, if the user selects any one of the displayed window display layout candidates (step S1405: YES), the activation app and the pair app are displayed on windows in the window display layout of the selected window display layout candidate (step S1406). Here, if the pair app has already been activated, the window is modified according to the layout of the window display layout candidate and displayed. On the other hand, if the pair app has not been activated, the window controller 212 newly activates the pair app, generates a window that displays the content of the pair app, and displays the window according to the window display layout candidate.

Then, the window display processing 3 ends here.

Figure 17:
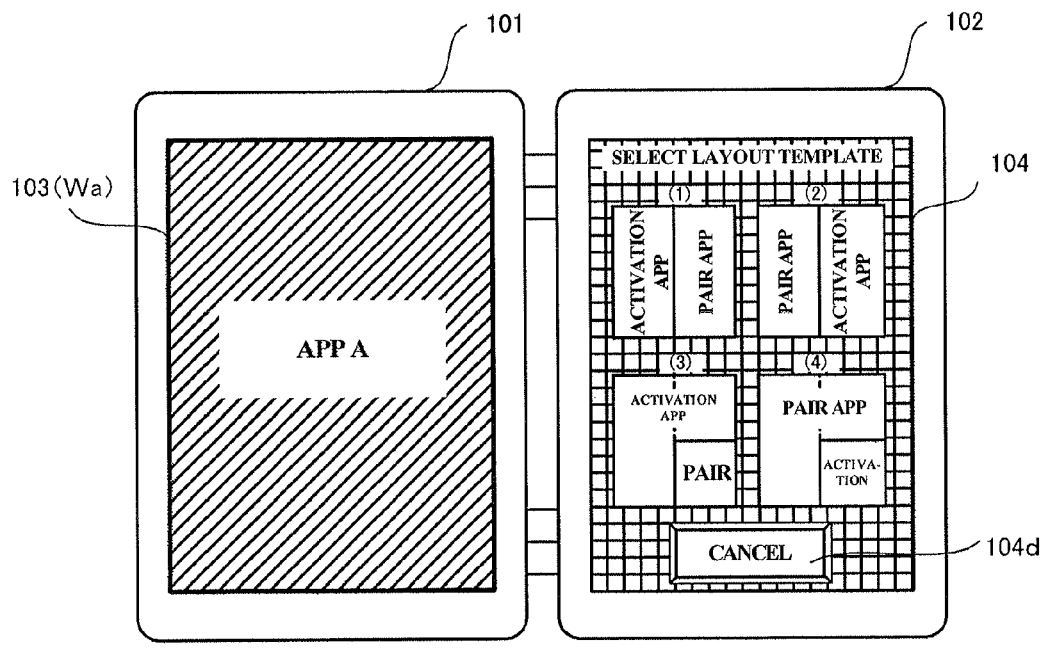
FIG. 17 is a diagram showing an example of a window display selection screen according to Embodiment 3.

The following will describe a screen that a user uses to select one of the window display layout candidates with reference to FIG. 17.

When a user activates an application, the window of that application is temporarily displayed on the first touch panel 103. At the same time, the second touch panel 104 displays window display layout candidates (I) to (VI) having the application as activation app among the window display layout candidates registered in the window layout template 301*a*.

The example of FIG. 17 shows:

(I) the window of activation app is displayed on the whole left screen, and the window of pair app is displayed on the whole right screen;

(II) the window of pair app is displayed on the whole left screen, and the window of activation app is displayed on the whole right screen;

(III) the window of activation app is displayed on the whole left and right screens, and the window of pair app is displayed on the lower half of the right screen in a hierarchy higher than the activation app; and (VI) the window of pair app is displayed on the whole left and right screens, and the window of activation app is displayed on the lower half of the right screen in a hierarchy higher than the pair app. The second touch panel 104 displays the above window display layout candidates (I) to (VI). A user selects any one of (I) to (VI) by manipulating the touch panel. Further, the user is also able to select display of the window in a default layout by touching the cancel button 104*d*.

It should be noted that, as in the case of the above window display layout candidates (III), (VI), when the windows of activation app and pair app overlap each other in a window display layout candidate, a window occupying a smaller area is displayed in a higher hierarchy than a window occupying a larger area.

It should also be noted that, for the window display layout candidates (III), (VI), the lower right screen display is possibly any one of upper right, lower left, and upper left screen displays.

When the user selects one of the above window display layout candidates (I) to (VI), windows are displayed in that window display layout. If the user selects cancellation by touching the cancel button 104*d*, the window of the activated application is displayed according to the default setting.

As described above, according to the portable appliance 300 of Embodiment 3, a window layout registered in the window layout template 301*a* is reproduced without complicated manipulation.

It should be noted that, while, in Embodiment 3, the window layout template 301*a* registers a predefined window display layout, the content of the window layout template 301*a* is not limited to this, and a user is possibly able to register arbitrary window display layout candidates at arbitrary time in the window layout template 301*a*.

While the embodiments of the present invention have been described so far, the present invention is not limited to the above embodiments.

In Embodiments 1 to 3, a configuration is described where one window is displayed on the whole right screen, on the upper or lower right screen, on the whole left screen, on the upper or lower left screen, on both screens, or a combination thereof. However, in the present invention, the window display method is not limited to this, and the window is possibly displayed in a variety of positions and sizes.

For example, an information processing device has three or more display devices, for each of which a number is defined. For example, if an information processing device has three display devices, numbers 1 to 3 are assigned to the display devices. Then, the positions of windows in Embodiments 1 to 3 are represented by the numbers of the display devices, and the same processing as Embodiments 1 to 3 is performed.

As another configuration, the position of a window in the window state list 212*a* is possibly defined by the coordinate values of three points that define the position and size of the window. This window state list 212*a* defines the position of a window on the display screen and the area occupied by the window, whether the window is left or right. In such a configuration, if a window display layout is changed, the changed window display layout is registered in the window history list 214a as a window display layout candidate. In this way, a user is allowed to select a favorable window display layout among a variety of window display layout candidates without limitation to displaying left or right, or on the whole screen, or the like.

Further, the present invention is possibly also applied to an information processing device having only one display device. In such a case, the position of a window becomes a value for defining which position on the display the window occupies. Here, a user is allowed to select a favorable window display layout among display layout candidates with an information processing device with one display rather than the one having a plurality of displays.

Further, one application is displayed on only one window in Embodiments 1 to 3. However, the present invention is possibly also implemented in a configuration where one application is displayed on a plurality of windows. In such an embodiment, a plurality of windows are registered for one application in the window layout state list and the window history list of Embodiments 1 to 3.

A central portion that performs processing for a portable appliance (an information processing device) comprising a controller 205, a storage 213, and the like, is implementable by a general computer system instead of using a dedicated system. For example, the portable appliance executing the processing is possibly configured by distributing a computer program for executing the above behavior stored in a computer-readable recording medium (flexible disk, CD-ROM (Compact Disc-Read Only Memory), DVD-ROM (Digital Versatile Disc-Read Only Memory), and the like), and installing the computer program in a computer. Further, the information processing device is possibly configured by storing the computer program in the storage of a server device on a communication network, such as the Internet, and downloading the computer program on a general computer system.

In order to realize the function of the portable appliance by sharing burden between the OS (operating system) and an application program, or in combination of the OS and the application program, only the application program part is possibly stored in a recording medium or a storage.

Further, the computer program is possibly superimposed on a carrier wave and delivered via a communication network. For example, the computer program is possibly posted on a board on a communication network (BBS: Bulletin Board System), and delivered via the network. Then, the processing is possibly executed by activating the computer program and executing the program under the control of OS in the same way as other applications.

It should be noted that the above embodiments are examples of specific embodiments of the present invention, without limitation to the technical scope of the present invention. The present invention is implementable in varied, applied and improved ways, within a scope of the technical idea described in the claims.

Part or whole of the above embodiments are also described as, without limitation to, the following supplementary notes.

(Supplementary Note 1)

An information processing device comprising:

a display that displays one or more windows;

a controller that controls the display so as to control display of the windows by the display and a layout of the windows; and a storage that stores a history of the layout of the windows that is displayed on the display, wherein the controller comprises:

a window controller that generates one or more candidates of the layout of the windows based on the history of the layout of the windows; and a display controller that causes the display to display the candidates generated by the window controller, the window controller issues an instruction to the display controller to display the windows in a layout selected from the candidates displayed on the display, and the display controller causes the windows to be displayed in the selected layout according to the instruction from the window controller.

(Supplementary Note 2)

The information processing device according to Supplementary Note 1, wherein the windows include:

a main window that displays processing details of a main application; and a pair window that displays processing details of a pair application that is activated in association with the main application, the storage stores a layout of the main window and the pair window in association with the main application and the pair application, the window controller, when the main application is newly activated, sets the layouts associated with the main application as the candidates of the layout of the windows among the layouts included in the history stored in the storage, and the display displays the main window and the pair window in the layout indicated by the selected candidate of the layout.

(Supplementary Note 3)

The information processing device according to Supplementary Note 2, wherein when the pair application that is associated with the selected candidate of the layout is not activated, the window controller newly activates the pair application and causes the display to display the pair window.

(Supplementary Note 4)

The information processing device according to Supplementary Note 2 or 3, wherein the display comprises:

a first touch panel comprising:

a first sensor that detects manipulated input by a user to the main window; and a first liquid crystal panel that displays the main window; and a second touch panel comprising:

a second sensor that detects manipulated input by the user to the pair window; and a second liquid crystal panel that displays the pair window.

(Supplementary Note 5)

The information processing device according to Supplementary Note 4, wherein the display controller comprises:

a first touch panel controller comprising:

a first manipulation determiner that receives manipulation information of the user detected by the first sensor and identifies manipulation performed by the user; and a first liquid crystal panel controller that causes the first liquid crystal panel to display the main window; and a second touch panel controller comprising:
  a second manipulation determiner that receives manipulation information of the user detected by the second sensor and identifies manipulation performed by the user; and
  a second liquid crystal panel controller that causes the second liquid crystal panel to display the pair window.

(Supplementary Note 6)

The information processing device according to any one of Supplementary Notes 1 to 5, wherein when two of the windows are simultaneously displayed and a focus is moved between the two windows, the window controller stores a layout of the two windows as a history in the storage.

(Supplementary Note 7)

The information processing device according to any one of Supplementary Notes 1 to 6, wherein the storage stores a template of the layout of the windows, and the window controller uses the template as the history of the layout of the windows.

(Supplementary Note 8)

The information processing device according to any one of Supplementary Notes 1 to 7, wherein the information processing device is a portable appliance comprising a plurality of display screens.

(Supplementary Note 9)

An information processing method comprising:

controlling a layout of one or more windows to display the windows;

storing a history of the layout of the displayed windows;

generating one or more candidates of the layout of the windows based on the stored history;

displaying the generated candidates; and displaying one or more windows in a layout indicated by a candidate selected from the displayed candidates.

(Supplementary Note 10)

A computer-readable recording medium that stores a program for causing a computer to execute the processing of:

controlling a layout of one or more windows to display the windows;

storing a history of the layout of the displayed windows;

generating one or more candidates of the layout of the windows based on the stored history;

displaying the generated candidates; and displaying one or more windows in a layout indicated by a candidate selected from the displayed candidates.

The present invention is based on Japanese Patent Application No. 2011-094263 filed as of Apr. 20, 2011. This specification includes all the description, claims, and figures of Japanese Patent Application No. 2011-094263 as reference.

INDUSTRIAL APPLICABILITY

The present invention is applicable for information processing devices that support manipulation of setting a plurality of windows displayed on a plurality of screens in a favorable display layout.

REFERENCE SIGNS LIST

100 Portable appliance
101 First chassis
102 Second chassis
103 First touch panel
104 Second touch panel
201 First sensor
202 First liquid crystal panel
203 Second sensor
204 Second liquid crystal panel
205 Controller
205a Window state list
206 First touch panel controller
207 First manipulation determiner
208 First display controller
209 Second touch panel controller
210 Second display controller
211 Second manipulation determiner
212 Window controller
213 Storage
214 Window history storage
214a Window history list
214b First layout candidate list
214c Second layout candidate list
300 Portable appliance
301 Window layout template storage
301a Window layout template
Wa, Wb, W1 to W4 Window

The invention claimed is:

1. An information processing device comprising:
a display that displays one or more windows;
a controller that controls the display so as to control display of the windows by the display and a layout of the windows; and
a storage that stores a history of the layout of the windows that is displayed on the display,
wherein the controller comprises:
  a window controller that generates one or more candidates of the layout of the one or more windows based on the history of the layout of the windows; and
  a display controller that causes the display to display the candidates generated by the window controller,
the window controller issues an instruction to the display controller to display the windows in a layout selected from the candidates displayed on the display, and
the display controller causes the windows to be displayed in the selected layout according to the instruction from the window controller,
wherein
the windows include:
  a main window that displays processing details of a main application; and
  a pair window that displays processing details of a pair application that is activated in association with the main application,
the storage stores a layout of the main window and the pair window in association with the main application and the pair application,
the window controller, when the main application is newly activated, sets the layouts associated with the main application as the candidates of the layout of the windows among the layouts included in the history stored in the storage, and
the display displays the main window and the pair window in the layout indicated by the selected candidate of the layout,
wherein,
the display comprises:
  a first touch panel comprising:
    a first liquid crystal panel that displays the main window; and a first sensor that detects a touch position of the first liquid crystal panel according to touching of the first liquid crystal panel; and
a second touch panel comprising:
a second liquid crystal panel that displays the pair window; and a second sensor that detects a touch position of the second liquid crystal panel according to touching of the second liquid crystal panel,
wherein
the display controller comprises:
a first touch panel controller comprising:
a first manipulation determiner that determines an operation performed by a user based on the touch position detected by the first sensor; and
a first liquid crystal panel controller that causes the first liquid crystal panel to display the main window; and
a second touch panel controller comprising:
a second manipulation determiner that determines an operation performed by the user based on the touch position detected by the second sensor; and
a second liquid crystal panel controller that causes the second liquid crystal panel to display the pair window.

2. The information processing device according to claim 1, wherein
when the pair application that is associated with the selected candidate of the layout is not activated, the window controller newly activates the pair application and causes the display to display the pair window.

3. The information processing device according to claim 1, wherein
when two of the windows are simultaneously displayed and a focus is moved between the two windows, the window controller stores a layout of the two windows as a history in the storage.

4. The information processing device according to claim 1, wherein
the storage stores a template of the layout of the one or more windows, and
the window controller uses the template as the history of the layout of the windows.

5. The information processing device according to claim 1, wherein
the information processing device is a portable appliance comprising a plurality of display screens.

6. An information processing method comprising:
controlling a layout of one or more windows to display the windows;
storing a history of the layout of the displayed windows;
generating one or more candidates of the layout of the windows based on the stored history;
displaying the generated candidates;
displaying one or more windows in a layout indicated by a candidate selected from the displayed candidates, wherein
the windows include: a main window that displays processing details of a main application; and a pair window that displays processing details of a pair application that is activated in association with the main application;
storing a layout of the main window and the pair window in association with the main application and the pair application;
when the main application is newly activated, setting the layouts associated with the main application as the candidates of the layout of the windows among the layouts included in the history stored in the storage;
displaying the main window and the pair window in the layout indicated by the selected candidate of the layout;
displaying the main window by a first liquid crystal panel;
detecting, by a first sensor, a touch position of the first liquid crystal panel according to touching of the first liquid crystal panel;
displaying the pair window by a second liquid crystal panel;
detecting, by a second sensor, a touch position of the second liquid crystal panel according to touching of the second liquid crystal panel;
determining, by a first manipulation determiner, an operation performed by a user based on the touch position detected by the first sensor;
causing, by a first liquid crystal panel controller, the first liquid crystal panel to display the main window;
determining, by a second manipulation determiner, an operation performed by the user based on the touch position detected by the second sensor; and
causing, by a second liquid crystal panel controller, the second liquid crystal panel to display the pair window.

7. A computer-readable recording medium that stores a program for causing a computer to execute the processing of:
controlling a layout of one or more windows to display the windows;
storing a history of the layout of the displayed windows;
generating one or more candidates of the layout of the windows based on the stored history;
displaying the generated candidates;
displaying one or more windows in a layout indicated by a candidate selected from the displayed candidates, wherein
the windows include: a main window that displays processing details of a main application; and a pair window that displays processing details of a pair application that is activated in association with the main application;
storing a layout of the main window and the pair window in association with the main application and the pair application;
when the main application is newly activated, setting the layouts associated with the main application as the candidates of the layout of the windows among the layouts included in the history stored in the storage;
displaying the main window and the pair window in the layout indicated by the selected candidate of the layout;
displaying the main window by a first liquid crystal panel;
detecting, by a first sensor, a touch position of the first liquid crystal panel according to touching of the first liquid crystal panel;
displaying the pair window by a second liquid crystal panel;
detecting, by a second sensor, a touch position of the second liquid crystal panel according to touching of the second liquid crystal panel;
determining, by a first manipulation determiner, an operation performed by a user based on the touch position detected by the first sensor;
causing, by a first liquid crystal panel controller, the first liquid crystal panel to display the main window;
determining, by a second manipulation determiner, an operation performed by the user based on the touch position detected by the second sensor; and causing, by a second liquid crystal panel controller, the second liquid crystal panel to display the pair window.

* * * * *